US009065727B1

(12) United States Patent
Liu et al.

(10) Patent No.: US 9,065,727 B1
(45) Date of Patent: Jun. 23, 2015

(54) DEVICE IDENTIFIER SIMILARITY MODELS DERIVED FROM ONLINE EVENT SIGNALS

(75) Inventors: Jia Liu, Sunnyvale, CA (US); Yijian Bai, San Ramon, CA (US); Manojav Patil, Sunnyvale, CA (US); Deepak Ravichandran, Mountain View, CA (US); Sittichai Jiampojamarn, Sunnyvale, CA (US); Shankar Ponnekanti, Mountain View, CA (US)

(73) Assignee: Google Inc., Mountain View, CA (US)

( * ) Notice: Subject to any disclaimer, the term of this patent is extended or adjusted under 35 U.S.C. 154(b) by 471 days.

(21) Appl. No.: 13/601,775

(22) Filed: Aug. 31, 2012

(51) Int. Cl.
*G06F 15/173* (2006.01)
*H04L 12/26* (2006.01)

(52) U.S. Cl.
CPC ....................................... *H04L 43/04* (2013.01)

(58) Field of Classification Search
CPC ... H04L 43/04; H04L 41/044; H04L 43/0817; H04L 67/22; G06F 17/30643; G06F 17/30598; G06F 17/30601; G06F 9/30036; G06F 17/30873; G06F 17/30696; G06Q 30/0256; G06Q 30/0255; G06Q 30/0601; G06Q 30/0253
USPC ................ 709/219, 223, 224; 705/7.29, 7.31, 705/26.1, 26.7, 14.53, 14.54, 341; 707/3, 707/710, 737, 749, 751, 769
See application file for complete search history.

(56) References Cited

U.S. PATENT DOCUMENTS

| 5,901,255 A | 5/1999 | Yagasaki |
| 5,974,398 A | 10/1999 | Hanson et al. |
| 6,185,514 B1 | 2/2001 | Skinner et al. |
| 6,266,649 B1 * | 7/2001 | Linden et al. ................ 705/7.29 |
| 6,269,351 B1 | 7/2001 | Black |
| 6,295,504 B1 | 9/2001 | Ye et al. |
| 6,487,538 B1 | 11/2002 | Gupta et al. |
| 6,539,375 B2 | 3/2003 | Kawasaki |
| 6,560,578 B2 | 5/2003 | Eldering |
| 6,567,797 B1 | 5/2003 | Schuetze et al. |
| 6,581,058 B1 | 6/2003 | Fayyad et al. |
| 6,598,054 B2 | 7/2003 | Schuetze et al. |
| 6,973,436 B1 | 12/2005 | Shkedi |

(Continued)

OTHER PUBLICATIONS

Notice of Allowance on U.S. Appl. No. 13/551,236 dated Jan. 30, 2014.

(Continued)

*Primary Examiner* — Yves Dalencourt
*Assistant Examiner* — Kidest Mendaye
(74) *Attorney, Agent, or Firm* — Foley and Lardner LLP; John D. Lanza

(57) ABSTRACT

A computerized method and system operable to build a device identifier similarity model with online event signals and determine similar network device identifiers. A processing circuit receives a first set of network device identifiers. The processing circuit represents each network device identifier of the first set by feature data associated with each network device identifier's network activity, where the feature data is associated with the content clicked-on or converted-on. The processing circuit applies abstractions on the feature data to form concepts. The processing circuit derives at least one hierarchy of feature data based on the keywords and concepts of the feature data. The processing circuit expands the feature data based on the derived at least one hierarchy of feature data and generates the device identifier similarity model based on the expanded feature data. The processing circuit is also capable of determining long-term and short-term history events.

16 Claims, 7 Drawing Sheets

(56) References Cited

U.S. PATENT DOCUMENTS

| | | |
|---|---|---|
| 6,982,726 B1 | 1/2006 | Berestov |
| 7,003,566 B2 | 2/2006 | Codella et al. |
| 7,103,584 B2 | 9/2006 | Lee |
| 7,202,791 B2 | 4/2007 | Trajkovic |
| 7,203,909 B1 | 4/2007 | Horvitz et al. |
| 7,257,546 B2 | 8/2007 | Ebrahimi et al. |
| 7,272,065 B2 | 9/2007 | Lovett |
| 7,454,705 B2 | 11/2008 | Cadez et al. |
| 7,685,278 B2 | 3/2010 | Cohen et al. |
| 7,689,458 B2 | 3/2010 | Heckerman et al. |
| 7,693,836 B2 | 4/2010 | Brave et al. |
| 7,693,863 B2 | 4/2010 | Martin et al. |
| 7,711,735 B2 | 5/2010 | Wu et al. |
| 7,734,632 B2 | 6/2010 | Wang |
| 7,739,314 B2 | 6/2010 | Datar et al. |
| 7,769,786 B2 | 8/2010 | Patel |
| 7,809,740 B2 | 10/2010 | Chung et al. |
| 7,822,636 B1 | 10/2010 | Ferber et al. |
| 7,882,175 B1 | 2/2011 | Nayfeh et al. |
| 7,904,448 B2 | 3/2011 | Chung et al. |
| 7,908,238 B1 | 3/2011 | Nolet et al. |
| 8,026,944 B1 | 9/2011 | Sah |
| 8,027,964 B2 | 9/2011 | Boulis |
| 8,082,189 B2 | 12/2011 | Fushimi et al. |
| 8,095,484 B2 | 1/2012 | Cheng et al. |
| 8,095,523 B2 | 1/2012 | Brave et al. |
| 8,117,211 B2 | 2/2012 | Yamamoto et al. |
| 8,131,733 B2 | 3/2012 | Wang |
| 8,260,656 B1 | 9/2012 | Harbick et al. |
| 8,321,934 B1 | 11/2012 | Cooley et al. |
| 8,355,958 B2 | 1/2013 | Fushimi et al. |
| 8,363,544 B2 | 1/2013 | Fishteyn et al. |
| 8,370,321 B2 | 2/2013 | Chu et al. |
| 8,386,519 B2 | 2/2013 | Kenedy et al. |
| 8,527,526 B1 | 9/2013 | Liu et al. |
| 8,566,422 B2 | 10/2013 | Johnson et al. |
| 8,655,695 B1 | 2/2014 | Qu et al. |
| 8,768,867 B1 | 7/2014 | Thaeler et al. |
| 2002/0087315 A1 | 7/2002 | Lee et al. |
| 2002/0099702 A1 | 7/2002 | Oddo |
| 2003/0033196 A1 | 2/2003 | Tomlin |
| 2003/0033336 A1 | 2/2003 | Gremmert |
| 2003/0074368 A1 | 4/2003 | Schuetze et al. |
| 2003/0220975 A1 | 11/2003 | Malik |
| 2004/0030667 A1 | 2/2004 | Xu et al. |
| 2004/0090472 A1 | 5/2004 | Risch et al. |
| 2004/0215509 A1 | 10/2004 | Perry |
| 2005/0049907 A1 | 3/2005 | Kumar et al. |
| 2005/0086105 A1 | 4/2005 | McFadden et al. |
| 2006/0015487 A1* | 1/2006 | Vest .................................. 707/3 |
| 2006/0026062 A1 | 2/2006 | Collins |
| 2006/0059144 A1 | 3/2006 | Canright et al. |
| 2006/0064411 A1 | 3/2006 | Gross et al. |
| 2006/0069612 A1 | 3/2006 | Hurt et al. |
| 2006/0069616 A1 | 3/2006 | Bau |
| 2006/0136294 A1 | 6/2006 | Linden et al. |
| 2006/0136589 A1 | 6/2006 | Konig et al. |
| 2006/0241923 A1 | 10/2006 | Xu et al. |
| 2006/0248035 A1 | 11/2006 | Gendler et al. |
| 2007/0038659 A1 | 2/2007 | Datar et al. |
| 2007/0061195 A1 | 3/2007 | Liu et al. |
| 2007/0067297 A1 | 3/2007 | Kublickis |
| 2007/0073579 A1 | 3/2007 | Immorlica et al. |
| 2007/0130005 A1 | 6/2007 | Jaschke |
| 2007/0156458 A1 | 7/2007 | Benja-Athon et al. |
| 2007/0156519 A1 | 7/2007 | Agassi et al. |
| 2007/0179846 A1 | 8/2007 | Jain et al. |
| 2007/0233556 A1 | 10/2007 | Koningstein |
| 2007/0239553 A1 | 10/2007 | Lin et al. |
| 2008/0071929 A1 | 3/2008 | Motte et al. |
| 2008/0108308 A1 | 5/2008 | Ullah |
| 2008/0126176 A1 | 5/2008 | Iguchi |
| 2008/0140524 A1 | 6/2008 | Anand et al. |
| 2008/0147659 A1 | 6/2008 | Chen et al. |
| 2008/0154717 A1 | 6/2008 | Saifee et al. |
| 2008/0183318 A1 | 7/2008 | Carrabis |
| 2008/0189174 A1 | 8/2008 | Moore |
| 2008/0201216 A1 | 8/2008 | Almeida |
| 2008/0215348 A1 | 9/2008 | Guldimann et al. |
| 2008/0294584 A1 | 11/2008 | Herz |
| 2008/0300958 A1 | 12/2008 | Gluck |
| 2009/0006974 A1 | 1/2009 | Harinarayan et al. |
| 2009/0012852 A1 | 1/2009 | O'Kelley et al. |
| 2009/0048925 A1 | 2/2009 | Song et al. |
| 2009/0077495 A1 | 3/2009 | Bhat et al. |
| 2009/0164274 A1 | 6/2009 | Narayanaswamy et al. |
| 2009/0164395 A1 | 6/2009 | Heck |
| 2009/0222734 A1 | 9/2009 | Fuller et al. |
| 2009/0228397 A1 | 9/2009 | Tawakol et al. |
| 2009/0248494 A1 | 10/2009 | Hueter et al. |
| 2009/0248496 A1 | 10/2009 | Hueter et al. |
| 2009/0265230 A1 | 10/2009 | Plachouras et al. |
| 2009/0265243 A1 | 10/2009 | Karassner et al. |
| 2009/0265290 A1 | 10/2009 | Ciaramita et al. |
| 2009/0281923 A1 | 11/2009 | Selinger et al. |
| 2009/0292386 A1 | 11/2009 | Cheng et al. |
| 2009/0327032 A1 | 12/2009 | Gunawardana et al. |
| 2010/0004975 A1 | 1/2010 | White et al. |
| 2010/0023382 A1 | 1/2010 | Fushimi et al. |
| 2010/0042500 A1 | 2/2010 | Pritchard et al. |
| 2010/0042502 A1 | 2/2010 | Farmanfarmaian et al. |
| 2010/0082421 A1 | 4/2010 | Tuladhar et al. |
| 2010/0121671 A1 | 5/2010 | Boutilier et al. |
| 2010/0121850 A1* | 5/2010 | Moitra et al. .................. 707/737 |
| 2010/0131835 A1 | 5/2010 | Kumar et al. |
| 2010/0138291 A1 | 6/2010 | Silverman et al. |
| 2010/0162036 A1* | 6/2010 | Linden et al. ...................... 714/4 |
| 2010/0169338 A1 | 7/2010 | Kenedy et al. |
| 2010/0169342 A1 | 7/2010 | Kenedy et al. |
| 2010/0174724 A1 | 7/2010 | Wallace et al. |
| 2010/0217648 A1* | 8/2010 | Agarwal et al. .................. 705/10 |
| 2010/0223258 A1 | 9/2010 | Ghahramani et al. |
| 2010/0228614 A1 | 9/2010 | Zhang et al. |
| 2010/0235241 A1 | 9/2010 | Wang et al. |
| 2010/0250558 A1 | 9/2010 | Wang |
| 2010/0262568 A1 | 10/2010 | Schwaighofer et al. |
| 2010/0268578 A1 | 10/2010 | Fushimi et al. |
| 2010/0274753 A1 | 10/2010 | Liberty et al. |
| 2010/0293057 A1 | 11/2010 | Haveliwala et al. |
| 2010/0318374 A1 | 12/2010 | Flake et al. |
| 2010/0325666 A1 | 12/2010 | Wiser et al. |
| 2011/0010324 A1 | 1/2011 | Bolivar et al. |
| 2011/0055008 A1 | 3/2011 | Feuerstein et al. |
| 2011/0055012 A1 | 3/2011 | Christianson et al. |
| 2011/0071900 A1 | 3/2011 | Kamath et al. |
| 2011/0077998 A1* | 3/2011 | Yan et al. ........................ 705/10 |
| 2011/0106796 A1 | 5/2011 | Svaic |
| 2011/0145248 A1 | 6/2011 | Doliov |
| 2011/0153423 A1 | 6/2011 | Elvekrog et al. |
| 2011/0166926 A1 | 7/2011 | Lv et al. |
| 2011/0166932 A1 | 7/2011 | Smith et al. |
| 2011/0173198 A1 | 7/2011 | Malleshaiah et al. |
| 2011/0191170 A1 | 8/2011 | Zhang et al. |
| 2011/0191176 A1 | 8/2011 | Merriman et al. |
| 2011/0191714 A1 | 8/2011 | Ting et al. |
| 2011/0196716 A1 | 8/2011 | Srinivasan et al. |
| 2011/0225608 A1 | 9/2011 | Lopatecki et al. |
| 2011/0231241 A1 | 9/2011 | Kesari et al. |
| 2011/0231257 A1 | 9/2011 | Winters |
| 2011/0231264 A1 | 9/2011 | Dilling et al. |
| 2011/0246267 A1 | 10/2011 | Williams et al. |
| 2011/0246298 A1* | 10/2011 | Williams et al. ........... 705/14.53 |
| 2011/0258039 A1 | 10/2011 | Patwa et al. |
| 2011/0264522 A1 | 10/2011 | Chan et al. |
| 2011/0270560 A1 | 11/2011 | Wang et al. |
| 2011/0288937 A1 | 11/2011 | Manoogian et al. |
| 2011/0295612 A1 | 12/2011 | Donneau-Golencer et al. |
| 2012/0010939 A1 | 1/2012 | Krishnamoorthy et al. |
| 2012/0036015 A1 | 2/2012 | Sheikh |
| 2012/0047013 A1 | 2/2012 | Bigby et al. |
| 2012/0047022 A1 | 2/2012 | Shamim et al. |
| 2012/0047132 A1 | 2/2012 | Fleming et al. |
| 2012/0054009 A1 | 3/2012 | Furman et al. |
| 2012/0059707 A1 | 3/2012 | Goenka et al. |

(56) References Cited

U.S. PATENT DOCUMENTS

| | | | |
|---|---|---|---|
| 2012/0059717 | A1 | 3/2012 | Furman et al. |
| 2012/0109734 | A1 | 5/2012 | Fordyce et al. |
| 2012/0131034 | A1* | 5/2012 | Kenedy et al. ............... 707/767 |
| 2012/0143687 | A1 | 6/2012 | Fushimi et al. |
| 2012/0166530 | A1 | 6/2012 | Tseng |
| 2012/0179543 | A1* | 7/2012 | Luo et al. .................. 705/14.54 |
| 2012/0191745 | A1 | 7/2012 | Velipasaoglu et al. |
| 2012/0197608 | A1 | 8/2012 | Pinto et al. |
| 2012/0209568 | A1 | 8/2012 | Arndt et al. |
| 2012/0239506 | A1 | 9/2012 | Saunders et al. |
| 2012/0253928 | A1 | 10/2012 | Jackson et al. |
| 2012/0254184 | A1 | 10/2012 | Choudhary et al. |
| 2012/0271782 | A1 | 10/2012 | Blowers et al. |
| 2012/0316972 | A1 | 12/2012 | Hu et al. |
| 2013/0006778 | A1 | 1/2013 | Raghunandan |
| 2013/0047076 | A1 | 2/2013 | McElfresh et al. |
| 2013/0054628 | A1 | 2/2013 | Meierhoefer et al. |
| 2013/0091001 | A1 | 4/2013 | Jia et al. |
| 2013/0124259 | A1 | 5/2013 | Chourey et al. |
| 2013/0124298 | A1 | 5/2013 | Li et al. |
| 2013/0124449 | A1 | 5/2013 | Pinckney et al. |
| 2013/0132415 | A1 | 5/2013 | Adams |
| 2013/0151312 | A1 | 6/2013 | Logan |
| 2013/0346182 | A1 | 12/2013 | Cheng et al. |
| 2014/0214842 | A1 | 7/2014 | Lu et al. |

OTHER PUBLICATIONS

Notice of Allowance on U.S. Appl. No. 13/551,236 dated May 22, 2014.
Office Action on U.S. Appl. No. 13/362,671 dated Dec. 31, 2013.
Office Action on U.S. Appl. No. 13/362,910 dated Sep. 11, 2013.
Office Action on U.S. Appl. No. 13/363,356 dated Mar. 14, 2014.
Office Action on U.S. Appl. No. 13/462,425 dated Mar. 12, 2014.
Office Action on U.S. Appl. No. 13/462,509 dated Dec. 27, 2013.
Office Action on U.S. Appl. No. 13/462,630 dated Jan. 14, 2014.
Office Action on U.S. Appl. No. 13/465,762 dated Jan. 16, 2014.
Office Action on U.S. Appl. No. 13/476,532 dated Dec. 30, 2013.
Office Action on U.S. Appl. No. 13/550,073 dated Oct. 22, 2013.
Office Action on U.S. Appl. No. 13/550,073 dated Feb. 10, 2014.
Non-Final Office Action on U.S. Appl. No. 13/363,353 dated Apr. 22, 2014.
Non-Final Office Action on U.S. Appl. No. 13/465,679 dated Apr. 14, 2014.
Notice of Allowance on U.S. Appl. No. 13/598,331 dated Mar. 20, 2014.
Office Action on U.S. Appl. No. 13/362,910 dated Apr. 8, 2014.
Office Action on U.S. Appl. No. 13/460,411 dated Jul. 15, 2014.
U.S. Notice of Allowance on U.S. Appl. No. 13/550073 dated Jun. 27, 2014.
U.S. Office Action on U.S. Appl. No. 13/362,671 dated Jun. 30, 2014.
U.S. Appl. No. 13/362,671, filed Jan. 31, 2012, Jia Liu et al.
U.S. Appl. No. 13/362,797, filed Jan. 31, 2012, Jia Liu et al.
U.S. Appl. No. 13/362,910, filed Jan. 31, 2012, Jia Liu et al.
U.S. Appl. No. 13/460,327, filed Apr. 30, 2012, Jia Liu et al.
U.S. Appl. No. 13/460,411, filed Apr. 30, 2012, Jia Liu et al.
U.S. Appl. No. 13/460,469, filed Apr. 30, 2012 Jia Liu et al.
U.S. Appl. No. 13/462,130, filed May 2, 2012, Jia Liu et al.
U.S. Appl. No. 13/462,425, filed May 2, 2012, Jia Liu et al.
U.S. Appl. No. 13/462,509, filed May 2, 2012, Jia Liu et al.
U.S. Appl. No. 13/462,630, filed May 2, 2012, Jia Liu et al.
U.S. Appl. No. 13/465,679, filed May 7, 2012, Alok Goel et al.
U.S. Appl. No. 13/465,730, filed May 7, 2012, Jia Liu et al.
U.S. Appl. No. 13/465,762, filed May 7, 2012, Jia Liu et al.
U.S. Appl. No. 13/476,532, filed May 21, 2012, Jia Liu et al.
U.S. Appl. No. 13/534,480, filed Jun. 27, 2012, Jia Liu et al.
U.S. Appl. No. 13/551,236, filed Jul. 17, 2012, Jia Liu et al.
U.S. Appl. No. 13/598,331, filed Aug. 29, 2012, Zhang et al.
"Clustering II" Powerpoint, EECS435, Spring 2008, 25 pages.
Bhat et al., Dynamic Real-Time Targeting Through Variable-Length Behavioral History, Apr. 18, 2009, © 2009 Microsoft, 4 pages.
http://en.wikipedia.org/wiki/Cluster_analysis; "Cluster Analysis", Wikipedia.org, retrieved Jan. 27, 2012, 15 pages.
http://en.wikipedia.org/wiki/Logistic_regression; "Logistic Regression", Wikipedia.org, retrieved Apr. 2, 2012, 14 pages.
Johnson, Confidence Intervals on Likelihood Estimates for Estimating Association Strengths, Brown University, DRAFT of May 28, 1999, 7 pages.
Renals, Classification and Nearest Neighbours; Informatics 2B: Learning and Data Lecture 4, Jan. 28, 2011, 27 pages.
support.google.com/adwords/bin/answer.py?hl=en&answer=1209882; "Where Your Ad Can Appear on the Display Network Depending on Your Targeting Methods", support.google.com, retrieved Apr. 16, 2012, 4 pages.
support.google.com/adwords/bin/answer.py?hl=en&answer=171271; "How Do I Create a Custom Combination List?", support.google.com, retrieved Apr. 16, 2012, 3 pages.
www.techterms.com/definition/rpm; "RPM", © 2012 TechTerms.com, retrieved Apr. 9, 2012, 1 page.
Notice of Allowance on U.S. Appl. No. 13/476,532 dated Aug. 20, 2014.
Notice of Allowance on U.S. Appl. No. 13/534,480 dated Jul. 30, 2014.
Notice of Allowance on U.S. Appl. No. 13/598,331 dated Jul. 31, 2014.
Office Action on U.S. Appl. No. 13/363,356 dated Aug. 13, 2014.
Office Action on U.S. Appl. No. 13/460,327 dated Aug. 21, 2014.
Office Action on U.S. Appl. No. 13/460,469 dated Aug. 27, 2014.
Office Action on U.S. Appl. No. 13/462,425 dated Aug. 1, 2014.
Office Action on U.S. Appl. No. 13/462,509 dated Aug. 26, 2014.
Office Action on U.S. Appl. No. 13/465,730 dated Aug. 26, 2014.
Office Action on U.S. Appl. No. 13/465,762 dated Aug. 27, 2014.
Notice of Allowance on U.S. Appl. No. 13/462,130 dated Apr. 22, 2013.
Office Action on U.S. Appl. No. 13/362,671 dated May 8, 2013.
Office Action on U.S. Appl. No. 13/362,797 dated Apr. 24, 2013.
Office Action on U.S. Appl. No. 13/462,630 dated May 8, 2013.
Office Action on U.S. Appl. No. 13/362,797 dated Jun. 3, 2013.

* cited by examiner

DEVICE IDENTIFIER SIMILARITY MODELS DERIVED FROM ONLINE EVENT SIGNALS

BACKGROUND

The present disclosure relates generally to similar device identifiers.

From a content provider's perspective, placing content on a web page may or may not be of interest or useful for the end users viewing the web page. In some systems, the content of a web page may be used to help select more relevant content to be provided with the web page. For example, a content provider selling golf clubs may provide content on a website devoted to golf, since visitors to the website may share a common interest in golf. Such systems may use keywords located in the text of the website to identify the content and the topics discussed on the website.

SUMMARY

A computerized method and system operable to build a device identifier similarity model with online event signals and determine similar network device identifiers. A processing circuit receives a first set of network device identifiers. The processing circuit represents each network device identifier of the first set by feature data associated with each network device identifier's network activity, where the feature data is associated with the content clicked-on or converted-on. The processing circuit applies abstractions on the feature data to form concepts. The processing circuit derives at least one hierarchy of feature data based on the keywords and concepts of the feature data. The processing circuit expands the feature data based on the derived at least one hierarchy of feature data and generates the device identifier similarity model based on the expanded feature data. The processing circuit is also capable of determining long-term and short-term history events.

Further, the processing circuit is capable of representing each device identifier as a vector of the feature data with dimension and value. The processing circuit is capable of applying a clustering algorithm on each vector to identify a plurality of clusters of device identifiers that share a common interest. The processing circuit is also capable of providing at least one subset of network device identifiers corresponding to each cluster.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION OF ILLUSTRATIVE IMPLEMENTATIONS

Figure 1:
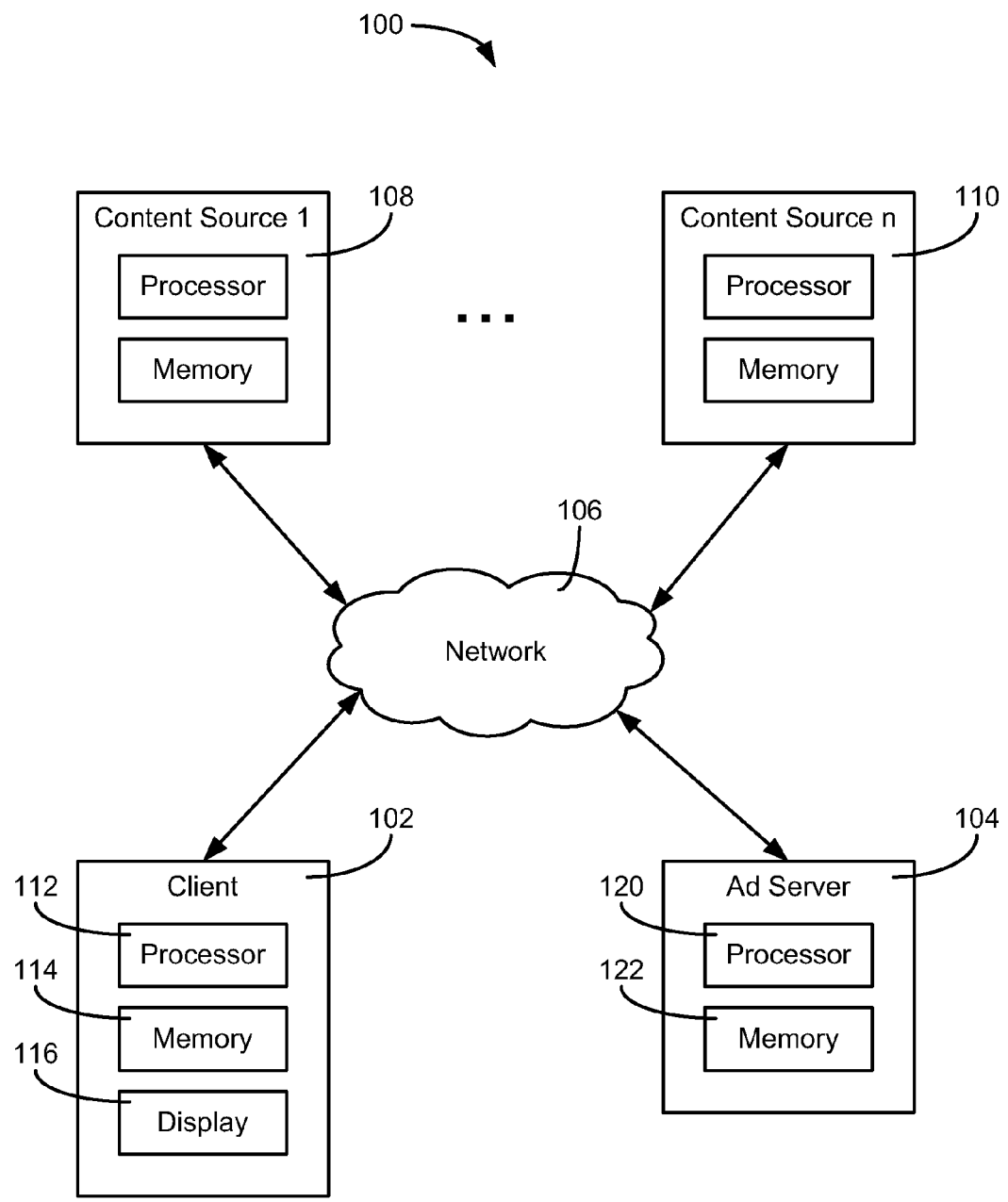
FIG. 1 is a block diagram of a computer system in accordance with an illustrative implementation.

Following below are more detailed descriptions of various concepts related to, and implementations of, methods and systems for identifying similar device identifiers. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

According to some aspects of the present disclosure, the online behaviors of device identifiers may be used to provide audience-based content. As used herein, online behavior refers to how a device identifier interacts with web pages on the Internet (e.g., which web pages are visited, the order in which the web pages are visited, how long a particular webpage is viewed, and similar information). In some implementations, a set of device identifiers associated with an online event (e.g., clicking on content, converting on content, making an online purchase, being added to a content provider's list of device identifiers, etc.) may be used as a basis to determine device identifiers having similar online behaviors. In some implementations, a time representation between a first online event and a second online event can be determined so as to build a similarity model for different content.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

In content-based systems, content is provided based on the content of a webpage. For example, a webpage devoted to golf may mention the terms "golf" and other golf-related terms. A system that places content on the webpage may use the content of the webpage itself and/or terms provided as part of a request for additional content (e.g., via a tag embedded into the code of the webpage), to determine a theme for the webpage. Based on the determined theme, a manufacturer of golf clubs may opt to place additional content on the webpage.

Audience-based systems, in contrast to content-based systems, involve selecting content based on the device identifier visiting a webpage, instead of the content of the webpage itself. For example, a device identifier may be associated with making an online reservation at a golf resort and navigating to a financial webpage to check the stock market. Based on golf being a potential interest category associated with the device identifier, for example, additional content from a manufacturer of golf clubs may be provided with the financial webpage, even though the financial webpage is unrelated to golf.

In one implementation of an audience-based system, device identifiers associated with an online purchase may have similar browsing histories before making the purchase and/or immediately thereafter. Device identifiers associated with a purchase of a good or service may also be associated with other similar online behaviors, such as researching a product before purchasing it, comparing prices for the product across multiple websites, purchasing related goods, etc. For example, a large percentage of device identifiers associated with purchasing airline tickets to Seattle may also be associated with researching websites about tourist attractions in Seattle, such as the Space Needle. Therefore, a content provider selling airline tickets to Seattle may wish to provide content to a particular device identifier based on whether the device identifier is associated with a previous visit to a website devoted to the Space Needle.

In various implementations, online behaviors surrounding a triggering event may be captured, such as the purchase of a good or service (an example conversion). In some situations, the triggering event may correspond to a user visiting an order confirmation webpage or clicking a submit-payment button. In such a case, the browsing history associated with a device identifier that precedes the event, as well as the browsing history for a time period thereafter (e.g., a short time period), may be used to identify similar device identifiers. For example, the triggering event may correspond to the online purchase of a pair of shoes. Such a purchase may trigger the addition of the user identify to a list of device identifiers also associated with shoe purchases. In some implementations, the browsing history for device identifiers on the list around the time of purchase (e.g., captured using identifier tag data or a similar mechanism) may be used to create a behavioral model. For example, the model may indicate a high likelihood of a device identifier being associated with a shoe purchase, if the identifier is associated with a recent online purchase of a dress. In some implementations, the behavioral model may be used in a system to determine whether a device identifier's online behavior is similar to that of the device identifiers surrounding an event. For example, a device identifier associated with the dress purchase may be presented with content related to the sale of shoes, based on a comparison between the online behavior and the behavioral model. In further implementations, a content provider or other party may provide data indicative of a set of device identifiers to the system, to identify similar device identifiers (e.g., to expand a remarketing list or other set of device identifiers).

One or more implementations described herein provides a method that allows a processing circuit to properly identify and represent shared interests of device identifiers in a set of device identifiers based on features derived from the web history of the respective device identifiers. Specifically, the processing circuit can derive such identification and representation of shared interests from one or more online events that have occurred in the device identifiers' web history. For example, the device identifiers' ad-click and ad-conversion histories can be identified and used to represent shared interests among the device identifiers in one or more sets of device identifiers. The representation of interest is derived by identifying a long-term online event history ("long-term history") and a short-term online event history ("short-term history"). An example of a long-term history is content that a device identifier in a given set of device identifiers has clicked on, or converted on, in the 30 days prior to the user appearing on the given set. An example of a short-term history is content that a device identifier in a given set of device identifiers has clicked on, or converted on, in the 2 hours prior to the device identifier appearing on the given set. By identifying the long-term history and the short-term history, the processing circuit can use these histories to identify the content, in the form of keywords from creatives, keywords from landing pages, keywords that were searched, etc. The processing circuit can then determine which of these contents/keywords correspond to the long-term history and which correspond to the short-term history.

The processing circuit, using the long-term and short-term histories, is then able to determine the types of ads (long-term or short-term) that should be shown to a device identifier similar to one or more device identifiers in a given set, based on the contents, keywords, etc. associated with the similar device identifier. As a more particular example, a user may search for "tablet computers" and then take a relatively long period of time to convert on the purchase of a tablet computer. In this example, content related to tablet computer would be considered long-term content. Conversely, a user may search for "pizza delivery" and then take a relatively short period of time to convert on the purchase of a pizza. In this example, content related to pizza delivery would be considered short-term content. By separating these types of ads, when, for example, a device identifier searches for "pizza delivery," the processing circuit would provide similar short-term content to the device identifier in the short-term future. The device identifier's interest in pizza delivery is deemed to expire within a relatively short amount of time. By understanding the difference between long-term history and short-term history, the processing circuit can better determine the device identifier's behavior for long-term and short-term content. Therefore, the processing circuit can also better determine the anticipated behavior of a device identifier similar to the device identifier upon receiving the long-term or short-term content.

Configurations of the present invention may be implemented as software stored on computer readable media for causing a computer to implement the software. The computer may have a hard drive, system memory, a microprocessor, and network connectivity hardware. In a similar manner, an implementation of the present invention may be implemented via a series of steps or processes executed by a computer via the microprocessors executing instructions stored in system memory. The present invention may also be embodied as a specially-designed computer which contains the software in memory and implements the instructions required by the software.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to client 102. System 100 may also include a content server 104, which provides content data to other computing devices over network 106.

Network 106 may be any form of computer network that relays information between client 102, content server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may further include a floppy disk, CD-ROM, DVD, magnetic disk, memory chip, application-specific integrated circuit (ASIC), field programmable gate array (FPGA), read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from content server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, content server 104 may include a processing circuit including a processor 120 and a memory 122. In some implementations, content server 104 may include several computing devices (e.g., a data center, a network of servers, etc.). In such a case, the various devices of content server 104 may be in electronic communication, thereby also forming a processing circuit (e.g., processor 120 includes the collective processors of the devices and memory 122 includes the collective memories of the devices).

Content server 104 may provide digital content to client 102 via network 106. For example, content source 108 may provide a webpage to client 102, in response to receiving a request for a webpage from client 102. In some implementations, content from content server 104 may be provided to client 102 indirectly. For example, content source 108 may receive content data from content server 104 and use the content as part of the webpage data provided to client 102. In other implementations, an advertisement from content server 104 may be provided to client 102 directly. For example, content source 108 may provide webpage data to client 102 that includes a command to retrieve content from content server 104. On receipt of the webpage data, client 102 may retrieve content from content server 104 based on the command and display the content when the webpage is rendered on display 116.

In various implementations, in addition to identifier tags directly accessible or made available to content server 104, user data may also be obtained from third-party identifier tags. The third parties may include parties other than device identifiers, a content server, or a search server. The third parties may be publishers and/or advertisers, for example. Third-party identifier tags associated with one of the third parties may not be directly accessible by the other third parties. However, the publishers may be provided with java scripts for logging third-party identifier tags. The advertisers may have access to identifier tags associated with device identifiers' purchases from the advertisers. In an implementation, the identifier tags may be automatically generated and stored on a user device, such as a user computer or a mobile device. For example, the website being visited by the device identifier can request the web browser of the user device to set a Hypertext Transfer Protocol (HTTP) identifier tag. The identifier tag can be associated with, for example, a particular user device and a particular web browser and their associated browsing history.

According to some implementations, content server 104 may be configured to determine whether the online behavior of a device identifier from client 102 is similar to that of other device identifiers. In some cases, content server 104 may determine the similarity between the online behavior associated with a device identifier and that of other device identifiers associated with a desired action, such as purchasing a certain good or navigating to a certain webpage. For example, a number of device identifiers may be associated with visiting webpages from content sources 108, 110 devoted to tourist attractions in Seattle and going on to purchase airline tickets to Seattle. In such a case, content server 104 may determine that a device identifier associated with client 102 is similar to those device identifiers associated with a purchase of airline tickets to Seattle based on client 102 navigating to webpages provided by content sources 108, 110.

In some implementations, content server 104 may receive browsing history data to determine the online behaviors of device identifiers around with a certain event. In one implementation, content server 104 may use identifier tags and/or pixel tags to determine an online behavior of a device identifier. For example, an identifier tag associated with content server 104 may be placed on client 102 and used as a device identifier. Whenever client 102 navigates to a webpage that includes content from content server 104, the identifier tag may be used to identify client 102 as having visited the webpage. Other mechanisms to determine a user's browsing history may be used, in various implementations. For example, client 102 may have a unique device ID which may be used to identify client 102 as it navigates between different websites. In some cases, client 102 may navigate to websites that are outside of the content network of content server 104 (e.g., the website does not include content from content server 104). In some implementations, content server 104 may receive publisher-provided data (e.g., device identifiers) from websites that are outside of the content network.

A user of client 102 may have control over whether content server 104 has the ability to collect data relating to client 102. In one implementation, the client identifier used by content server 104 may be anonymized so that no personally identifiable information can be determined for the client identifier, or the client identifier's geographic location may be generalized where location information is obtained (such as to a city, ZIP code, or state level), so that a particular location of the client identifier cannot be determined. Thus, the user of client 102 may have control over how information is collected about them and used by content server 104, in various implementations.

According to various implementations, content server 104 may generate a behavioral model based on the online behaviors of device identifiers associated with an online event, such as visiting a certain webpage, purchasing a particular good or service, being added to a list of users by a content provider, or the like. In some implementations, content server 104 may receive a list of device identifiers from a content provider (e.g., a set of identifier tags or other device identifiers). For example, an online retailer may provide a list of device identifiers associated with purchases of a certain good or service to content server 104. Content server 104 may use the provided list to determine a set of similar device identifiers by comparing the online behaviors of the device identifiers on the list to that of other device identifiers. In some cases, content server 104 may provide an indication of the set of identified device identifiers back to the content provider.

Figure 2:
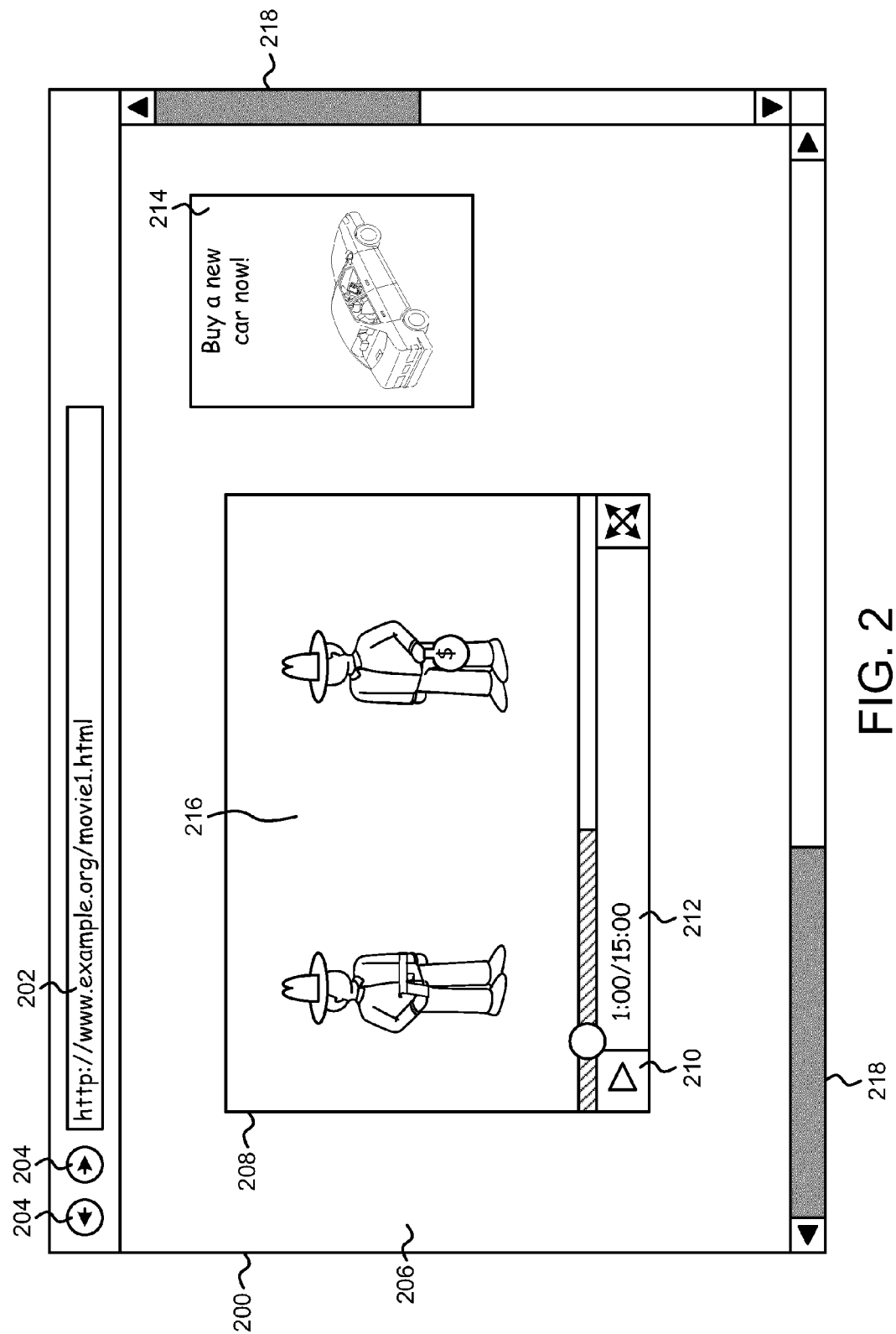
FIG. 2 is an illustration of an example web page having content.

Referring now to FIG. 2, an example display 200 is shown. Display 200 is in electronic communication with one or more processors that cause visual indicia to be provided on display 200. Display 200 may be located inside or outside of the housing of the one or more processors. For example, display 200 may be external to a desktop computer (e.g., display 200 may be a monitor), may be a television set, or any other stand-alone form of electronic display. In another example, display 200 may be internal to a laptop computer, mobile device, or other computing device with an integrated display.

As shown in FIG. 2, the one or more processors in communication with display 200 may execute a web browser application (e.g., display 200 is part of a client device). The web browser application operates by receiving input of a uniform resource locator (URL) into a field 202, such as a web address, from an input device (e.g., a pointing device, a keyboard, a touchscreen, or another form of input device). In response, one or more processors executing the web browser may request data from a content source corresponding to the URL via a network (e.g., the Internet, an intranet, or the like). The content source may then provide webpage data and/or other data to the client device, which causes visual indicia to be displayed by display 200.

In general, webpage data may include text, hyperlinks, layout information, and other data that is used to provide the framework for the visual layout of displayed webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "moviel.html" provided by the website, "www.example.org." The webpage data may include data that specifies where indicia appear on webpage 206, such as movie 216 or other visual objects. In some implementations, the webpage data may also include additional URL information used by the client device to retrieve additional indicia displayed on webpage 206. For example, the file, "moviel.html," may also include one or more content tags used to retrieve additional content 214 from a remote location (e.g., a content server, the content source that provides webpage 206, etc.) and to display additional content 214 on display 200.

The web browser providing data to display 200 may include a number of navigational controls associated with webpage 206. For example, the web browser may include the ability to go back or forward to other webpages using inputs 204 (e.g., a back button, a forward button, etc.). The web browser may also include one or more scroll bars 218, which can be used to display parts of webpage 206 that are currently off-screen. For example, webpage 206 may be formatted to be larger than the screen of display 200. In such a case, one or more scroll bars 218 may be used to change the vertical and/or horizontal position of webpage 206 on display 200.

In one example, additional data associated with webpage 206 may be configured to perform any number of functions associated with movie 216. For example, the additional data may include a media player 208, which is used to play movie 216. Media player 208 may be called in any number of different ways. In one implementation, media player 208 may be an application installed on the client device and launched when webpage 206 is rendered on display 200. In another implementation, media player 208 may be part of a plug-in for the web browser. In another implementation, media player 208 may be part of the webpage data downloaded by the client device. For example, media player 208 may be a script or other form of instruction that causes movie 216 to play on display 200. Media player 208 may also include a number of controls, such as a button 210 that allows movie 216 to be played or paused. Media player 208 may include a timer 212 that provides an indication of the current time and total running time of movie 216.

The various functions associated with additional content 214 may be implemented by including one or more content tags within the webpage code located in "moviel.html" and/or other files. For example, "moviel.html" may include a content tag that specifies that a content slot is to be located at the position of additional content 214. Another content tag may request additional content from a remote location, for example, from a content server, as webpage 206 is loaded. Such a request may include client identification data (e.g., an identifier tag, device ID, etc.) used by the content server as a device identifier. In this way, the content server is able to determine browsing history associated with a device identifier as it is used to navigate between various webpages that participate in the content network (e.g., webpages that include content from the content server).

Figure 3:
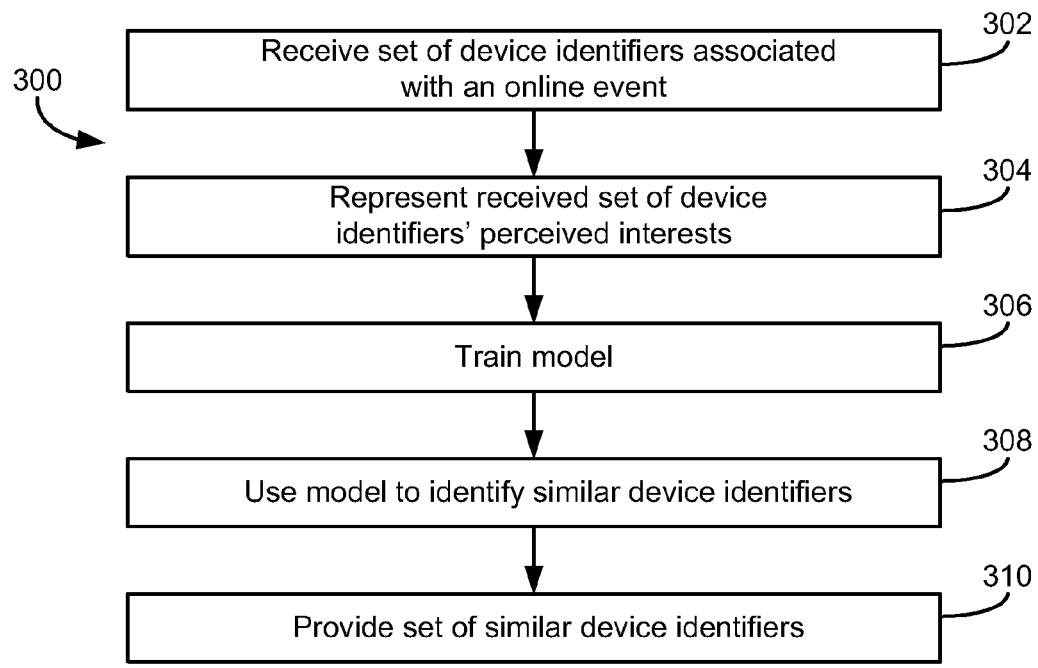
FIG. 3 is an example process for identifying similar online device identifiers.

FIG. 3 is an example process 300 for determining similar online device identifiers. Process 300 may be utilized by a content server or other server having access to browsing history data for a set of device identifiers. Process 300 may be used, for example, to provide relevant content to users. In some implementations, content providers may compete in an auction for the ability to place content on a given webpage. A content provider having access to a set of device identifiers that are similar to other device identifiers associated with making a purchase, for example, may adjust their bid accordingly if one of the similar device identifiers requests a webpage having embedded content.

Process 300 includes receiving data indicative of a set of device identifiers associated with an online event (block 302). In general, an online event may correspond to any action performed by an online user. For example, an online event may correspond to visiting a webpage, clicking on a particular link (e.g., a hyperlink, a content link, etc.), navigating between a set of webpages, ending their browsing session, spending a certain amount of time on a given webpage, purchasing a good or service, signing up for a newsletter, requesting to be contacted, or any other action that may be performed by an online user. In some implementations, the set of device identifiers may include device identifiers (e.g., identifier tags, device IDs, etc.) for the electronic devices operated by the users. In some implementations, the set of device identifiers may also include information about when the event occurred with respect to a user in the set. For example, the received set may include information about when a particular user visited a webpage, made a purchase, or performed any other online action.

In one example, an online retailer may wish to place content via a content network. To provide relevant content, the retailer may generate a list of device identifiers associated with visits to the retailer's website and/or purchases made via the website. The list of device identifiers may be a list of identifier tags, device IDs, or other information that can be used by the content network to determine online behaviors associated with the device identifiers on the list. For example, a mobile telephone having a unique device ID may be used to access the retailer's website. If the user has opted in to allowing information about the user to be collected, the retailer may record the device ID as a device identifier and provide it to the content network. The content network may then use the device identifier to identify similar device identifiers.

Process 300 includes representing the received set of device identifiers' perceived interests, based on one or more online events performed by the received set of device identifiers (block 304). In some implementations, the system that receives the set of device identifiers may retrieve information regarding the browsing histories associated with the device identifiers in the received set. For example, a server of a content network may store browsing history information for device identifiers that visited websites participating in the content network (e.g., websites that display content provided by the content network). Such information may be collected, for example, by receiving identification information (e.g., an identifier tag, device ID, etc.) each time a device identifier is used to access a webpage displaying content from the content network. Such information may be used to reconstruct, or partially reconstruct, a user's browsing history, provided that the user has opted in to allowing such information to be used. In other implementations, the browsing history may be predetermined by another device outside of the content network (e.g., the browsing history data may be publisher-provided).

In some implementations, representing the received set of device identifiers' perceived interests may be based on determining short-term browsing histories surrounding an online event. In these implementations, process 300 includes determining short-term browsing histories surrounding the online event (block 304). The short-term browsing history for a device identifier refers to data about which webpages were visited within a particular period of the online event. In various implementations, the short-term browsing history for a device identifier surrounding an event may include data about the webpages visited by the device identifier less than one, two, five, twelve, or twenty four hours prior to the event. In some implementations, the short-term browsing history for a device identifier may include data about the webpages visited by the device identifier less than one, two, five, twelve, or twenty four hours after the occurrence of the event. According to various implementations, the short-term browsing histories may be determined for the entire set of device identifiers or for a subset of the device identifiers (e.g., a random sampling of the device identifiers, a subset selected up to a predetermined amount of device identifiers, etc.).

In some implementations, representing the received set of device identifiers' perceived interests may be based on determining long-term browsing histories (e.g., browsing history data from a period longer than the particular period associated with the short-term browsing history) surrounding an online event. In these implementations, process 300 includes determining long-term browsing histories surrounding the online event (block 304). Determining long-term browsing histories surrounding the event may be done in addition to or in lieu of determining short-term browsing histories surrounding the online event (block 304). According to various implementations, the long-term browsing histories may be determined for the entire set of device identifiers or for a subset of the device identifiers (e.g., a random sampling of the device identifiers, a subset selected up to a predetermined amount of device identifiers, etc.).

In certain circumstances, in contrast to long-term browsing history, short-term browsing history may provide more insight into a user's interests surrounding the event. For example, a user may have a long-term interest in professional football. However, the user may have a short-term interest in purchasing flowers. Analyzing the user's short-term browsing history surrounding his online purchase of flowers may exclude the topic of football from being associated with the purchase of flowers. In other circumstances, in contrast to short-term browsing history, long-term browsing history may provide more insight into a user's interests surrounding the event. For example, a user may have a long-term interest in tablet computers. However, the user may have a short-term interest in reviewing golf statistics. Analyzing the user's long-term browsing history surrounding his eventual online purchase of a tablet computer may exclude topic of golf statistics from being associated with the purchase of a tablet computer.

For both the short-term browsing histories and the long-term browsing histories, the time period associated with each can be adjusted and various time periods can be tried to optimize results. For example, short-term browsing histories may be defined by a predetermined value of two hours between the online event and the device identifier becoming part of the set of device identifiers. In this example, the predetermined value could be adjusted to three hours or a different amount of time. Further, various time periods could be tried to better filter the results. For example, if the predetermined value is set at two hours, the predetermined value could be incremented by some unit of time (e.g., seconds, minutes, hours, days, etc.). In this example, if the predetermined value were incremented by an hour, process 300 would determine the short-term browsing histories at three hours and/or one hour between the online event and the device identifier becoming part of the set of device identifiers.

Process 300 includes training a behavioral model (block 306). In some implementations, the browsing history data associated with the device identifiers in the received set may be used to train a behavioral model. In general, the behavioral model may determine commonalities among the online behaviors associated with the device identifiers. For example, a large number of users that purchase organic peanut butter from a retailer may have recently visited a webpage devoted to a recipe for an all-organic peanut butter and banana sandwich. Such a characteristic may be used to identify other device identifiers that are also likely to become associated with purchasing organic peanut butter from the retailer.

In some implementations, the training of the behavioral model may also include identifying the contents of the content and/or webpage related to an online event. For example, the content and/or characteristics of the content of the webpages visited, content selected, selected content that led to a conversion, etc. can be identified and used to train the behavioral model. In such implementations, the content can be identified in the form of keywords from creatives, keywords from landing webpages, keywords that were searched on, etc. As an example, identified keywords may include "smart phone," the names of various smart phones, the names of various tablet computers, "minor pentatonic scale," "baking," "cookies," and the names of various restaurants. Further, in such implementations, keywords can be grouped together into related concepts. The concepts can be derived by utilizing abstractions on the feature data in order to represent different categories of interests, where each concept represents a category of interests. The utilization of abstractions is further described below. As an example, identified keywords can be grouped into concepts, such as smart phones, tablet computers, guitar technique, cooking, and restaurant reviews. The keywords and concepts, collectively, are feature data of the received set of device identifiers. Therefore, the feature data can be used to train the behavioral model (block 306).

In some implementations, important keywords and concepts from all of the keywords and concepts collected can also be identified. Identifying important keywords and concepts can also be thought of as filtering the results to find relevant content that is desired to be determined. For example, keywords and concepts that are associated with a conversion may be deemed important, in contrast to keywords and concepts that did not lead to a conversion, keywords and concepts that led to a lower quality site, keywords and concepts that led to unrelated content, etc. In this sense, for example, the keywords and concepts, which are types of feature data, are associated with the content clicked-on or converted-on by the device identifier. Thus, the feature data is also associated with the content clicked-on or converted-on by the device identifier. For the example above, it may be desired to determine content related to the concepts of smart phones and/or tablet computers and not content related to the concepts of guitar technique, cooking, or restaurant reviews. In this example, the feature data related to smart phones and/or tablet computers would be identified as important feature data, while the other feature data would not be identified as important. When identifying important keywords and concepts, process 300 may take into consideration the quality and importance of the source of the feature data. For example, process 300 can assign a quality score to each landing webpage; thus, the feature data from content that lead to high-quality landing webpages are given more importance than feature data from content that lead to low-quality webpages. Similarly, feature data on converted content may weigh more than content that were only clicked-on by the device identifiers, when the ultimate goal for the content provider is to generate conversions rather than clicks.

In some implementations, the training of the behavioral model may also include deriving at least one hierarchy of keywords and concepts based on the identified feature data. In deriving at least one hierarchy of keywords and concepts, process 300 can expand the identified feature data beyond the contents of content and/or webpage related to the original online event. In so doing, process 300 can identify at least one related keyword or concept, which can then be used as expanded feature data with which to determine similar users. In some scenarios, the training of the behavioral model may derive multiple hierarchies of keywords and concepts based on the identified feature data. Process 300 can expand the feature data across a concept hierarchy of related keywords, related concepts, related clusters, a commercial product hierarchy (such as a product hierarchy found at amazon.com or ebay.com), etc. For example, if the identified feature data includes the keyword, "android," process 300 may expand the feature data to include "mobile phones" as a more general concept, "mobile phone software" as another related concept, and/or "tablet computers" as yet another concept. In order to identify the important related keywords and concepts and to determine the hierarchy of multiple concepts, process 300 may implement certain tools, such as interest category mapping and clustering, described below.

In some implementations, once the important feature data has been identified and the feature data has been expanded based on the derivation of at least one hierarchy of keywords and concepts, the behavioral model may be trained by aggregating the filtered and expanded feature data into a vector representation of the received set of device identifiers. This is done by representing the received set of device identifiers as a set of feature vectors. In general, a feature vector refers to an nth dimensional vector of characteristics of a device identifier, such as information about browsing history associated with the device identifier. The characteristics may be identified, for example, from short-term or long-term browsing history, the identified important keywords or concepts and/or the expanded feature data.

In some implementations, characteristics of a device identifier may be normalized by utilizing a term-frequency inverse document frequency (TF-IDF) count. Webpages visited by a device identifier may be represented by their uniform resource location (URL) or similar network address. Selected content may be content embedded into a webpage (e.g., additional content 214 in FIG. 2), pop-up content, banner content, or the like. In general, a conversion refers to the performance of a certain online action. Typically, the action of a conversion is the purchase of a good or service. For example, selected content that led to a conversion may be content that diverted a user to a website at which the user made a purchase. Other examples of conversions include creating a user profile on a website, subscribing to receive marketing offers (e.g., by providing a postal or email address, by providing a telephone number, etc.), or downloading software from a website.

In some implementations, the feature vectors may be aggregated to find a set of characteristics based on a statistical measurement of the aggregated characteristics. For example, the aggregated characteristics may be the number of times a webpage was visited by the set of device identifiers, the number of times the content was clicked, and/or the number of times clicked content led to a conversion. In various implementations, a statistical measurement of the aggregated characteristics may be the average, median, centroid, or other statistical measure of the aggregated characteristics. In one implementation, the aggregated characteristics having the highest amount of activity may be selected (e.g., the top five most visited webpages, the most-clicked content, etc.).

In an implementation, the received set of device identifiers may be subdivided into clusters to generate the behavioral model. In some cases, different groups of device identifiers may be associated with the same event and have widely different interests and motivations. For example, a roll of copper tubing may be purchased from an online hardware store both by plumbers and by hobbyists. In such a case, the browsing histories for these two groups may widely differ. For example, the short-term browsing histories of the plumbers may include a number of webpages devoted to making a certain type of plumbing repair. Likewise, the short-term browsing histories of the hobbyists may include a number of webpages devoted to do-it-yourself projects to make a heat sink using copper tubing. Using clustering allows for the different groups of device identifiers to be treated separately in the behavioral model.

In some implementations, the received set of device identifiers may be subdivided into clusters by computing a weighted nearest-neighbor list for each user in the received set of device identifiers. For example, the feature vectors may be analyzed to determine which vectors are closest to one another. In one implementation, the nearest-neighbor list for the received set of device identifiers may be determined by applying a k-nearest-neighbor (KNN) algorithm, or similar algorithm, to the feature vectors. For example, webpages visited by plumbers may be used to form one cluster, while webpages visited by home brewing hobbyists may be used to form a second cluster, based on their nearest neighbors.

Process 300 includes using the model to identify similar device identifiers to those in the received set (block 308). In implementations in which the device identifiers in the received set are represented as feature vectors, device identifiers not in the received set may be represented in a similar manner. For example, the received set may include feature vectors of characteristics for device identifiers A, B, and C, i.e., the set of vectors {A, B, C}. Similarly, a feature vector of characteristics may be determined for a device identifier D (e.g., a device identifier not in the received set). In one implementation, the centroid of {A, B, C} may be determined and compared with the feature vector for user D to identify device identifier D as being a similar device identifier. For example, if the feature vector for device identifier D is close to that of the centroid vector of {A, B, C}, device identifier D may be considered to be a similar device identifier.

In implementations in which clusters are used, the device identifiers having feature vectors closest to that of the clusters may be identified as being similar device identifiers. For example, a device identifier associated with visiting webpages devoted to plumbing repairs may be identified as being similar to device identifiers associated with the purchase of copper tubing. In some implementations, nearest-neighbor lists may be determined for all device identifiers being analyzed (e.g., those in the received set of device identifiers and those device identifiers being compared to the received set). The nearest-neighbors from all device identifiers may be aggregated and sorted by nearest-neighbor weights. The device identifiers having the highest weights in the aggregated neighbor list may then be identified as being a set of similar device identifiers.

A limit may be placed on the number of identified similar device identifiers, in various implementations. For example, the top one hundred device identifiers having vectors closest to the centroid of the received set of device identifiers may be identified. Similarly, the top one hundred device identifiers having the highest weights in an aggregated nearest neighbor list may be identified. In some implementations, the limit may be adjusted based on a parameter. For example, a content provider may provide a set of device identifiers to a content network and request that the system identify one thousand device identifiers similar to those in the provided set.

Process 300 includes providing the set of similar device identifiers (block 310). In general, the set of similar device identifiers may include device identifiers (e.g., identifier tags, unique device IDs, etc.) or other information that may be used to determine that a device identifier in the set of similar device identifiers is being used to request a webpage. For example, the set of similar device identifiers may be provided to a content provider and used by the content provider to select relevant content. In some implementations, the set of similar device identifiers may be provided to a content server that conducts an auction. A content provider may utilize the set of similar device identifiers to adjust auction bids to provide content to those device identifiers. For example, a device identifier that visits a webpage devoted to plumbing repairs may have a browsing history similar to that of device identifiers associated with purchasing copper tubing. When the device identifier visits a webpage, even a webpage unrelated to plumbing, content providers may participate in an auction to place content on the webpage. In such a case, a content provider may place a higher bid in the auction to provide content for copper tubing to the device identifier on the webpage.

Therefore, if a set of device identifiers (received at block 302) is known to be a high-performing set of device identifiers, process 300 is able to identify a set of similar device identifiers (identified at block 308) who are likely to share some common interests with the received set of device identifiers. Process 300 further provides the set of similar users (at block 310), thus, likely expanding the potential reach for a content provider's content, beyond the received set of device identifiers.

Figure 4:
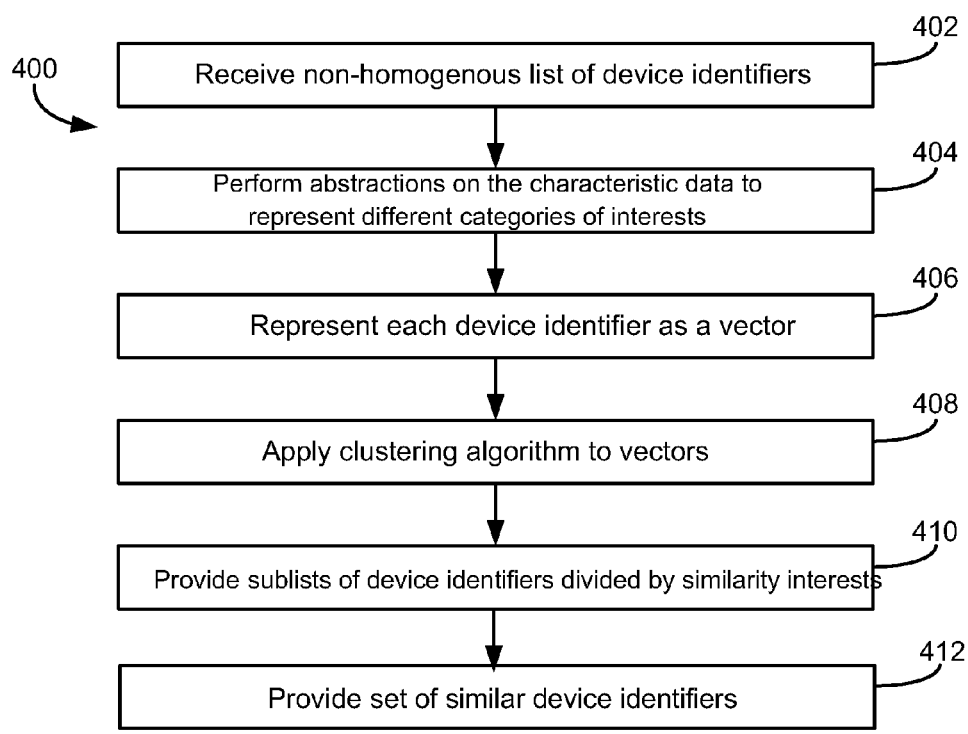
FIG. 4 is an example process for dividing a non-homogenous set of device identifiers into subsets based on strongly shared similarity interests of the device identifiers on each subset.

In some implementations, as illustrated in FIG. 4, the processing circuit performs process 400. Process 400 includes receiving a non-homogeneous set of network device identifiers and storing the set in a system memory (block 402). The set is non-homogenous in that the network device identifiers have one thing in common, but may otherwise have dissimilar interests. For example, device identifiers in the non-homogeneous set may have visited the homepage of a retailer who sells multiple categories of items, but viewed or purchased dissimilar products.

Each network device identifier is represented by feature data associated with the network device identifier's network activity. Feature data may include, but are not limited to, web pages visited, topics in the web pages, salient keywords in the web pages, content displayed on the web pages, content clicked on, search terms entered for searches performed, products purchased, device identifiers' geography, etc. However, the user associated with the device identifier may have control over whether and how information is collected about them and used by a content server.

Process 400 includes utilizing abstractions on the raw data in order to represent different categories of interests (block 404). Each abstraction may contain different amounts of detail for the each category of interest. For example, a web page's contents can be abstracted into multiple "concepts" where each concept represents a category of interests. This abstraction can be done at multiple levels of granularity such as a "cooking" concept, a "cooking pot" concept, or a "cooking utensils" concept. This abstraction allows the processing circuit to transform the information received from the non-homogenous set into layers of abstractions based on categories of interests that can be processed one layer at a time.

Process 400 includes representing each network device identifier as a vector based on the abstractions of the feature data associated with each network device identifier (block 406). Each vector is an nth dimensional vector of the feature data associated with each network device identifier. Each feature data has a corresponding feature value. To further explain block 406, consider an example of a device identifier, u_1, who performed the following network activities:

> visited web pages w_1, w_2 and w_3 with feature values w_1_v, w_2_v and w_3_v, respectively. In this context, a feature value is a function of how many times u_1 visited the web pages in a given period of time.
>
> viewed content a_1 and a_2 with feature values a_1_v and a_2_v, respectively. In this context, a feature value is a function of how many times u_1 viewed the content.

The full feature vector for u_1 is <0, . . . . 0, w_1_v, w_2_v, w_3_v, 0, 0, . . . , a_1_v, a_2_v, 0, . . . . 0>, where the vector has feature values only for the network activities listed above (e.g. w_1, w_2, w_3, a_1 and a_2) and a feature value of 0 when u 1 did not perform the network activity. The vector may be represented in a sparse format: <w_1: w_1_v, w_2: w_2_v, w_3: w_3_v, a_1: a_1_v, a_2: a_2_v>, where the network activity and corresponding feature value appear next to each other. Therefore, each dimension of the vector represents a single feature data of the device identifier.

In some implementations, the vectors may be aggregated to generate a feature representation or set of activities performed by the device identifiers in a non-homogeneous set. For example, if a device identifier set_1 includes device identifiers u_1 and u_2, the vectors representing u_1 and u_2 may be aggregated to generate a feature representation of the set of device identifiers. The aggregation may be performed by simple vector addition, vector dot product, or any other algorithm involving vector arithmetic.

After the non-homogenous set is transformed by the processing circuit into a collection of vectors, process 400 includes applying a clustering algorithm to the vectors (block 408). In cluster analysis, a set of objects, in this case, the network device identifiers, are assigned into groups or clusters. The objects in the same cluster are more similar to each other than the objects in other clusters. The processing circuit can identify device identifiers with multiple common interests by forming multiple clusters in the same device identifier set.

For each cluster, the program represents the common interest as an aggregation of vectors inside the cluster. In some implementations, the processing circuit arrives at an aggregation by adding up the values for each dimension to form a single vector to represent the cluster. This single vector does not necessarily have to be a member of the data set. More complex aggregation methods can also be applied.

Several types of clustering algorithms are known and can be utilized by the processing circuit described in this application. These clustering algorithms include, but are not limited to, hierarchical clustering, k-means clustering, distribution-based clustering, conceptual clustering, and density-based clustering. The processing circuit applies one of the clustering algorithms to the vectors to identify a plurality of clusters of network device identifiers that share a common interest, where the common interest is represented as an aggregation of vectors inside each cluster. The processing circuit may then display the clusters on a user interface.

Process 400 includes dividing the non-homogenous set into subsets based on the strongly shared similar interests identified by the clusters (block 410). By taking the non-homogeneous set of device identifiers and dividing it into subsets based on strongly shared interests of the device identifiers in each subset, the system can select more relevant content for users when the system employs a audience-based system. The processing circuit may display the networking device identifiers as subsets categorized by interests on a user interface.

After the non-homogenous set is divided into subsets represented as a collection of vectors, the process 400 may include identifying device identifiers that share similar interests, but did not appear in the non-homogeneous set (block 412). For example, the non-homogeneous set of network device identifiers may include vectors of device identifier features for device identifiers A, B, and C, i.e., the set of vectors {A, B, C}. Similarly, a vector of device identifier features may be determined for a potential similar device identifier D (e.g., a device identifier not in the non-homogeneous set). In some implementations, the centroid of {A, B, C} may be determined and compared with the vector for potential similar device identifier D to identify potential similar device identifier D as being a similar device identifier. For example, if the feature vector for potential similar device identifier D is close to that of the centroid vector of {A, B, C}, potential similar device identifier D may be considered to be a similar device identifier.

In order to score similarity, the processing circuit represents each potential similar device identifier as a vector based on the abstractions of the potential similar device identifier's feature data. The processing circuit then calculates the distance between the vector representing the potential similar device identifier and each cluster identified from the feature data of the non-homogeneous set. The processing circuit calculates on overall similarity score to the non-homogeneous set by aggregating the distances to each cluster. Different aggregation methods can be utilized. An inverse of distance between the vectors represents the similarity between the device identifiers.

The potential similar device identifiers are scored and ranked based on similarity, with the top N device identifiers above a certain threshold value being assigned as similar device identifiers. A limit may be placed on the number of identified similar device identifiers, in various implementations. For example, the top one hundred device identifiers having vectors closest to the centroid of each subset of the non-homogeneous set of network device identifiers may be identified. In some implementations, the limit may be adjusted based on a parameter. For example, a content provider may provide a set of device identifiers to a content network and request that the system identify one thousand device identifiers similar to those in the provided set. The processing circuit then generates a second set of network device identifiers (the set of similar device identifiers). The processing circuit may then display the second set of network device identifiers on a user interface either as one set, or as subsets based on the strongly shared interests identified by the cluster analysis on the non-homogeneous set.

Figure 5:
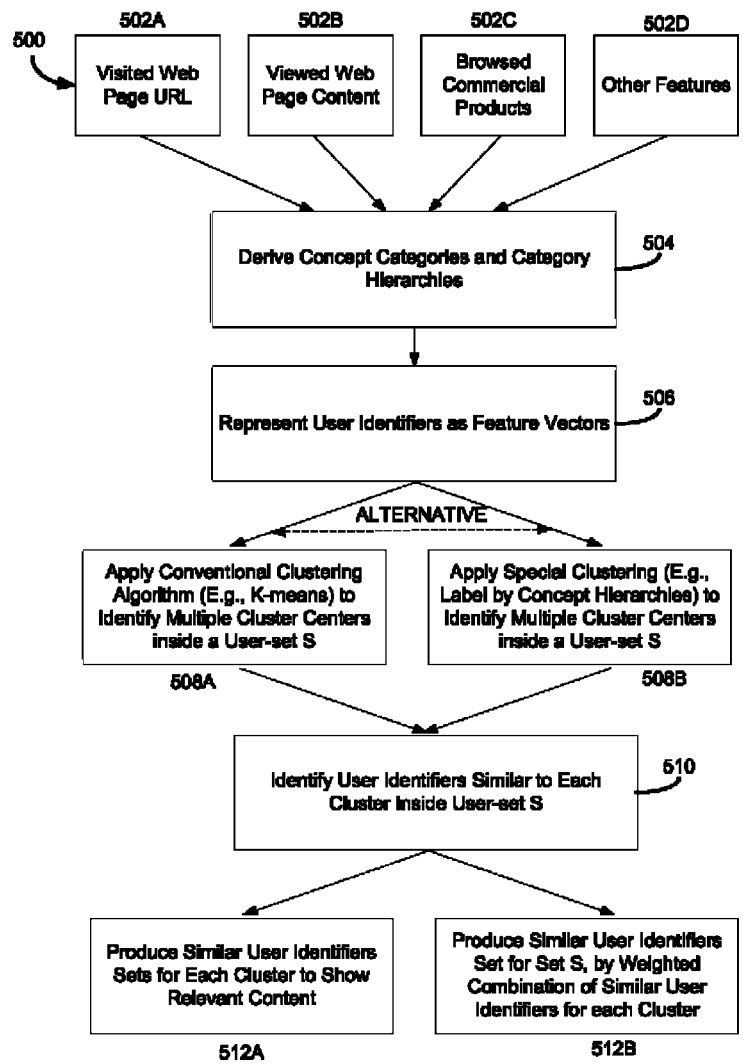
FIG. 5 is an example process for dividing a non-homogenous set of device identifiers into subsets based on strongly shared similarity interests of the device identifiers on each subset and providing a set of similar device identifiers.

FIG. 5 illustrates an example process for dividing a non-homogenous set of device identifiers into subsets based on strongly shared similarity interests of the device identifiers on each subset and providing a set of similar device identifiers. In step 502, each network device identifier in the non-homogenous set of device identifiers is represented by feature data associated with the network device identifier's network activity. For example, the feature data may include web page URLs visited by the anonymous device identifier (502A), web page content viewed by the anonymous device identifier (502B), commercial products browsed by the anonymous device identifier (502C), or other features (502D) including, but not limited to, salient keywords in the web pages, content displayed on the web pages, content clicked on, search terms entered for searches performed, products purchased, device identifiers' geography, etc.

In step 504, abstractions are used on the raw data in order to derive concept categories and category hierarchies by the same method associated with block 404 of FIG. 4. In step 506, device identifiers are represented as feature vectors by the same method associated with block 406 of FIG. 4.

After the non-homogenous set is transformed by the processing circuit into a collection of vectors, step 508 includes applying a clustering algorithm to the vectors. In some implementations, a conventional clustering algorithm such as k-means clustering (step 508A) can be used. In other implementations, a special clustering algorithm, such as conceptual or hierarchical clustering (step 508B) can be used.

In k-means clustering, the location of k centroids are randomly defined, one centroid for each cluster. Next, each observation, in this case, each device identifier, is assigned to the group that has the closest centroid. When all of the device identifiers have been assigned, the center of each group is calculated, and each centroid relocates to that position. This process is repeated until the centroids no longer change position.

In conceptual clustering, each cluster represents a concept description. For example, the concept description may be a word cluster. In general, a word cluster may be a set of words that convey the same or similar ideas. A word cluster may be a set of synonyms, according to some implementations. For example, the concept description may include the word "hotel." A word cluster that includes the word "hotel" may be as follows:

cluster_1={inn, hotel, hostel, lodge, motel, public house, spa}

Such a cluster may be used to identify concept descriptions devoted to the same topic, but use different terminology to do so. These word clusters or concepts can be divided into hierarchies. For example, if every concept or word cluster is its own cluster, similar pairs of clusters can be merged into a parent cluster. The similarity between pairs can be defined in many ways, for example, by the minimum distance between the points, by the average distance between the points, etc. The process is repeated until all the concept descriptions are divided into hierarchies defined by a parent cluster.

After the non-homogenous set of device identifiers is divided into subsets corresponding to each cluster, step 510 includes identifying similar device identifiers to each subset or cluster by the same method associated with block 412 of FIG. 4. A set of similar device identifiers can be produced for each cluster (step 512A), or a set of similar device identifiers can be produced for the non-homogeneous set of device identifiers as a whole by performing weighted combination of similar device identifier sets for each cluster (step 512B). Based on the similarities identified, the system can select relevant content to show each device identifier.

Figure 6:
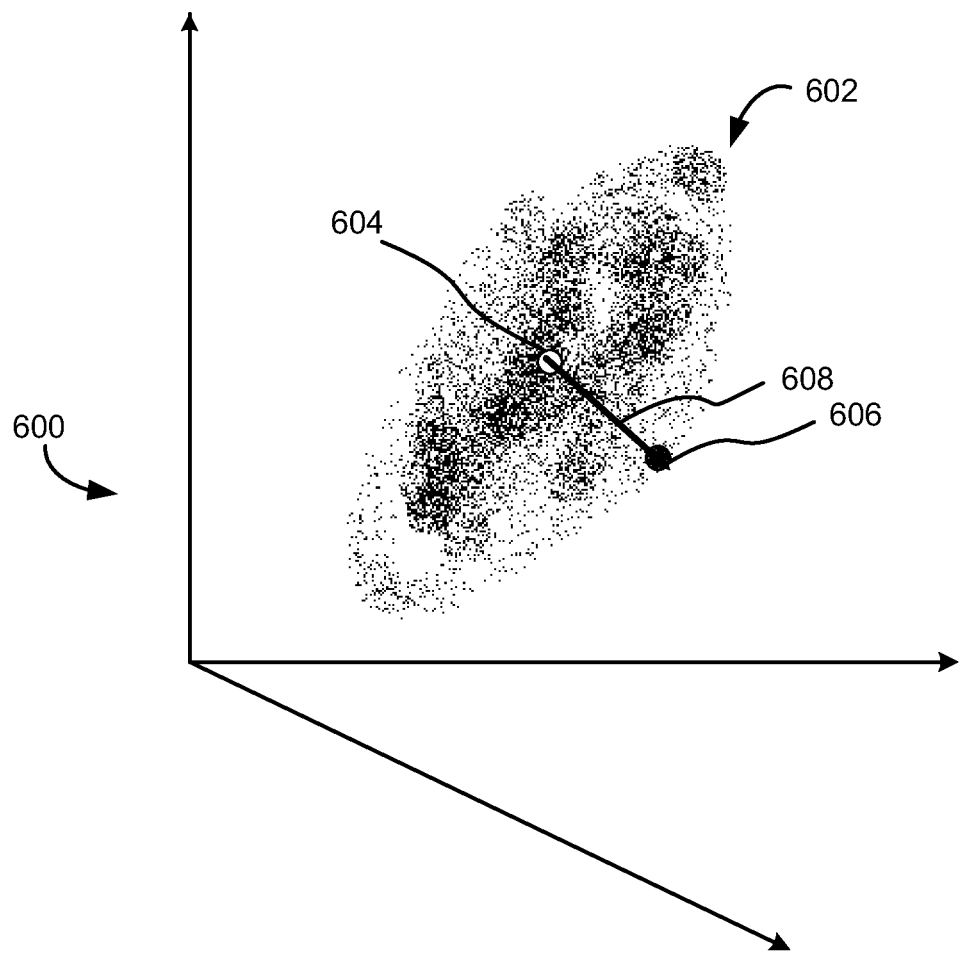
FIG. 6 is a simplified illustration of a Cartesian space populated with device identifier data and with a computed centroid according to an implementation.

As mentioned, in implementations in which the device identifiers in the received set are represented as feature vectors, device identifiers not in the received set may be represented in a similar manner. The feature vectors may be disposed into a hyper-dimensional space. In an implementation, the hyper-dimensional space may be a Cartesian space. FIG. 6 illustrates a simplified 3-dimensional Cartesian space 600, although it is noted that the hyper-dimensional space may actually include four or more dimensions, such as hundreds, thousands, or even millions of dimensions. Each axis in the hyper-dimensional space may represent a possible device identifier signal, such as a website visited by a user.

For example, the received data for a first set of device identifiers may include feature vectors of user characteristics for a large number of device identifiers 602, shown as a "cloud" in the hyper-dimensional space 600. In an example, the first set of device identifiers may be an original set of device identifiers who participated in a study of their online activities, and may be provided for use in identifying similar device identifiers in a new device identifiers set when their data becomes available.

Each data point in the "cloud" may represent a device identifier, and correspond to a feature vector having a component in each axis in the hyper-dimensional space 600. The first set of device identifiers 602 may represent device identifiers who have known behaviors and who had made an online purchase, for example. A statistical model can be built to characterize the behaviors of the first set of device identifiers 602. In an implementation, the statistical model may simply be a centroid 604 computed from the "cloud."

Similarly, a feature vector of user characteristics may be determined for a device identifier not in the first set of device identifiers. For example, this device identifier has not made the online purchase, but may be considered as one of a second set of device identifiers to which content be provided based on that the second set of device identifiers have a certain likelihood of making such an online purchase, as predicted from their behaviors being similar to those of the first set of device identifiers.

In one implementation, the centroid 604 may be compared with the feature vectors for the second set of device identifiers to identify these device identifiers as being similar to the first set of device identifiers. For example, if the feature vector for a device identifier 606 is close to that of the centroid 604, as measured by a distance 608 that may be compared with a predetermined threshold, device identifier 606 may be considered to be a device identifier similar to the first set of device identifiers.

In implementations in which clusters are used, the device identifiers having feature vectors closest to that of the clusters may be identified as being similar device identifiers. For example, a device identifier that visits webpages devoted to plumbing repairs may be identified as being similar to device identifiers that purchased copper tubing. In some implementations, nearest-neighbor lists may be determined for all device identifiers being analyzed (e.g., those in the received set of device identifiers and those device identifiers being compared to the received set). The nearest-neighbors from all device identifiers may be aggregated and sorted by nearest-neighbor weights. The device identifiers having the highest weights in the aggregated neighbor list may then be identified as being a set of similar device identifiers.

In some implementations, a limit may be placed on the number of identified similar device identifiers. For example, the top one hundred device identifiers having vectors closest to the centroid of the first set of device identifiers may be identified. Similarly, the top one hundred device identifiers having the highest weights in an aggregated nearest neighbor list may be identified. In some implementations, the limit may be adjusted based on a parameter. For example, a content provider may provide a set of device identifiers to a content network and request that the system identify one thousand device identifiers similar to those in the provided set.

Figure 7:
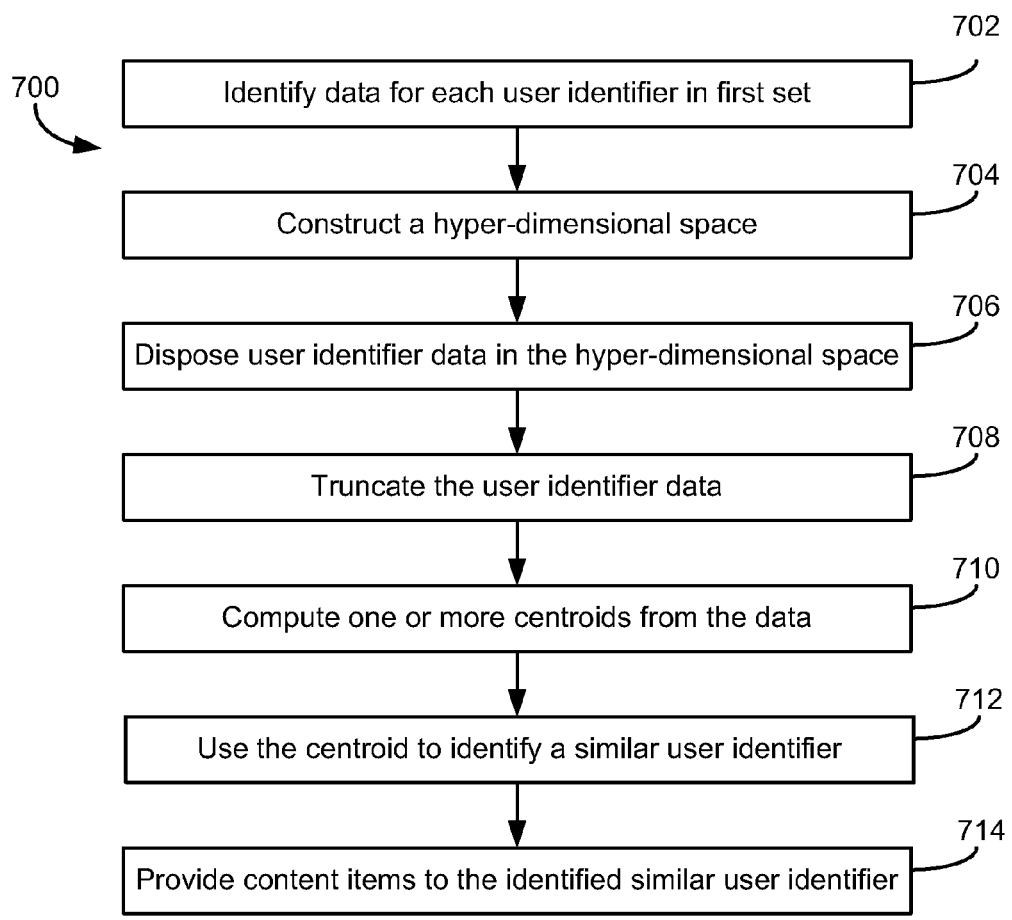
FIG. 7 is an example process for identifying similar online device identifiers based on a statistical model according to another implementation.

After the first set of device identifiers (each of which may be identified by a unique identifier tag) are provided, the following operations may be formed according to the described implementations, as illustrated in a process 700 shown in FIG. 7.

Process 700 may include, for each device identifier in the first set, identifying user data or signals (block 702). These data or signals may indicate the device identifier's online behaviors, may include counts of various actions performed by the device identifiers, such as the websites they visit, the ads they clicked, the topics of the pages they visited, etc.

Process 700 may include constructing a hyper-dimensional space (block 704) to represent the user data. Each possible signal may be represented by an axis in a hyper-dimensional Cartesian space, such as a simplified illustration shown in FIG. 4. The actual number of dimensions may be hundreds, thousands, or more. The different dimensions may relate to different behaviors (e.g., websites visited) of the device identifier. A component of a user data (signal) strength along an axis may indicate the number of visits to the website.

Process 700 may include disposing the first set of device identifiers in the hyper-dimensional space (block 706). Each device identifier may be represented by a single point in this space, and the single point also corresponds to a user vector.

Some of these dimensions will be more predictive of device identifier interests than others. As such, unlike other situations where all of the inputs to the model are known, in an implementation the process may start off with a large number of inputs and then only the ones that provide the strongest signals are preserved. For example, the dimensions indicating the websites most frequently visited by the device identifier are preserved. Accordingly, process 700 may include truncating the user data (block 708).

The user data in the hyper-dimensional space may be truncated/filtered by various methods. In an implementation, the user data (vector) strengths may be normalized, for example from 0 to 1. Device identifiers with the weakest signals, i.e., below a threshold (e.g., 0.01, or 0.4), may be removed from the set. Thus, the outliers in the first set of device identifiers may be removed, thereby improving the statistics of the first set of the device identifiers. In another implementation, the number of dimensions of the hyper-dimensional space may be capped, for example to a number of 50, by limiting the hyper-dimensional space to the 50 dimensions with the strongest user signals. This also removes the weaker user signals, and may save memory in the computation (as each extra dimension may drastically increase the memory consumption).

Process 700 may include constructing a statistical model of the truncated data, such as computing one or more centroids (block 710) from the hyper-dimensional space populated with all such device identifier points. The centroid may indicate aggregated behaviors of the first set device identifiers.

In some implementations, instead of a centroid, which may be a single point in the hyper-dimensional space (Cartesian or non-Cartesian), a statistical distribution such as a Gaussian distribution can be constructed based on the device identifier positions. The statistical distribution and its associated statistics parameters may better characterize the behaviors of the first set of device identifiers. In some cases where multiple device identifier sets or clusters of device identifiers are included in the data, statistical tools such as principle component analysis may be employed to model the data.

In an operation 712, the statistical model such as the centroid may be used to model (or uniquely identify) a device identifier with behaviors predicted based on the statistical model to be similar to the behaviors of the first set of device identifiers. This can be achieved, for example, by calculating a distance in the hyper-dimensional space from data indicative of behaviors of the device identifier to the centroid. In general, the distance may be computed from the data to a statistical distribution as well, in either a Cartesian space or non-Cartesian space. If the distance is smaller than a threshold, then the device identifier may be considered as a similar device identifier and included in a second set of device identifiers. As such, a large number of device identifiers can be identified as having behaviors similar to those of the first set of device identifiers.

Process 700 may further include providing content items to the identified similar device identifier (block 714). The content items may be selected based on the aggregated behaviors of the first set of device identifiers, as represented by the centroid or other statistical models.

In an example, the selected content items may include advertisements to be provided to the second device identifier set, for example through an auction process. As such, bids can be placed for online content to be provided to the second set of device identifiers. The system may thus allow bids to be automatically adjusted based on the predicted online behaviors of the second set of device identifiers. For example, a device identifier may visit a webpage and an automatic auction may ensue among content providers to determine what content is presented to the device identifier. Content providers may automatically adjust their bids based on the similarity of the device identifier's online behavior to that of the first set of device identifiers, such as those that seem particularly interested in the content based on purchasing the product depicted in the content. Other potential uses of this information are also possible. In an example, content providers may bid for presenting content to device identifiers who have not visited certain websites but who are predicted to be likely future visitors based on their visits to other websites or search histories.

The described implementations may thus provide improved audience-based systems. Not only the first set of device identifiers with known behaviors (such as viewing one website and making a purchase from another website) can be delivered with selected content items, a second, potentially larger set of device identifiers may be identified. The second set of device identifiers may not have made a purchase as do the first set of device identifiers, but can be identified based on the predictive model described above.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus or processing circuit on data stored on one or more computer-readable storage devices or received from other sources.

The term client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface (GUI) or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A computerized method of building a device identifier similarity model with online event signals, the method comprising:
   receiving at a processing circuit a first set of network device identifiers;
   identifying, by the processing circuit, an online event associated with network activity of each network device identifier of the first set;
   identifying, using the processing circuit, for each network device identifier of the first set, one or more long-term browsing history events surrounding the identified online event based on the network device identifier's network activity, the long-term browsing history events corresponding to events occurring prior to a first time from the identified online event;
   identifying, using the processing circuit, for each network device identifier of the first set, one or more short-term browsing history events surrounding the identified online event based on the network device identifier's network activity, the short-term browsing history events corresponding to events occurring after the first time from the identified online event;
   representing, using the processing circuit, each device identifier of the first set as a vector based on feature data corresponding to each network device identifier's network activity, the feature data comprising keywords corresponding to content associated with the device identifier's network activity;
   applying, using the processing circuit, abstractions on the feature data to form concepts, wherein each concept represents a category of interest;
   deriving, using the processing circuit, at least one hierarchy of the feature data based on the keywords and concepts of the feature data;
   expanding, using the processing circuit, the feature data based on the derived at least one hierarchy of the feature data;
   applying, using the processing circuit, a clustering algorithm on each of the vectors to identify a plurality of clusters of device identifiers that share a common interest;
   providing, using the processing circuit, at least one subset of network device identifiers corresponding to each of the plurality of cluster; and
   generating, using the processing circuit, the device identifier similarity model based on the expanded feature data.

2. The computerized method according to claim 1, further comprising:
   determining using the processing circuit a first online event signal and a second online event signal based on each network device identifier's network activity; and
   determining using the processing circuit a time representation of the time between the first online event signal and the second online event signal.

3. The computerized method according to claim 2, further comprising:
   comparing using the processing circuit the time representation to a first predetermined value; and
   identifying using the processing circuit a long-term time representation, if the time representation is greater than the first predetermined value.

4. The computerized method according to claim 2, further comprising:
   comparing using the processing circuit the time representation to a second predetermined value; and
   identifying using the processing circuit a short-term time representation, if the time representation is lesser than the second predetermined value.

5. A computerized method for identifying similar network device identifiers, the method comprising:
   receiving, at a processing circuit, a first set of network device identifiers;
   identifying, by the processing circuit, an online event associated with network activity of each network device identifier of the first set;
   identifying, using the processing circuit, for each network device identifier of the first set, one or more long-term browsing history events surrounding the identified online event based on the network device identifier's network activity, the long-term browsing history events corresponding to events occurring prior to a first time from the identified online event;
   identifying, using the processing circuit, for each network device identifier of the first set, one or more short-term browsing history events surrounding the identified online event based on the network device identifier's network activity, the short-term browsing history events corresponding to events occurring after the first time from the identified online event;
   representing, using the processing circuit, each device identifier of the first set as a vector based on feature data corresponding to each network device identifier's network activity, the feature data comprising keywords corresponding to content associated with the device identifier's network activity;
   applying, using the processing circuit, abstractions on the feature data to form concepts, wherein each concept represents a category of interest;
   deriving, using the processing circuit, at least one hierarchy of the feature data based on the keywords and concepts of the feature data;
   expanding, using the processing circuit, the feature data based on the derived at least one hierarchy of the feature data;
   applying, using the processing circuit, a clustering algorithm on each of the vectors to identify a plurality of clusters of device identifiers that share a common interest;
   providing, using the processing circuit, at least one subset of network device identifiers corresponding to each of the plurality of clusters; and
   generating using the processing circuit the set of similar network device identifiers based on the expanded feature data.

6. The computerized method according to claim 5, further comprising:
   identifying using the processing circuit the one or more long-term browsing history events and the one or more the short-term browsing history events by:

identifying using the processing circuit a time representation between a first online event and a second online event; and comparing using the processing circuit the time representation with a predetermined value, wherein if the time representation is greater than the predetermined value the time representation will indicate a long-term browsing history event, and wherein if the time representation is lesser than the predetermined value the time representation will indicate a short-term browsing history event.

7. The computerized method according to claim 6, wherein the predetermined value is adjustable.

8. The computerized method according to claim 6, further comprising:

incrementing, by the processing circuit, the predetermined value by a unit of measurement.

9. A system for building a device identifier similarity model with online event signals comprising a processing circuit including a processor and a memory coupled thereto, the processing circuit operable to:

receive a first set of network device identifiers;

identify an online event associated with network activity of each network device identifier of the first set;

identify, for each network device identifier of the first set, one or more long-term browsing history events surrounding the identified online event based on the network device identifier's network activity, the long-term browsing history events corresponding to events occurring prior to a first time from the identified online event;

identify, for each network device identifier of the first set, one or more short-term browsing history events surrounding the identified online event based on the network device identifier's network activity, the short-term browsing history events corresponding to events occurring after the first time from the identified online event;

represent each device identifier of the first set as a vector based on feature data corresponding to each network device identifier's network activity, the feature data comprising keywords corresponding to content associated with the device identifier's network activity;

apply abstractions on the feature data to form concepts, wherein each concept represents a category of interest;

derive at least one hierarchy of the feature data based on the keywords and concepts of the feature data;

expand the feature data based on the derived at least one hierarchy of the feature data;

apply a clustering algorithm on each of the vectors to identify a plurality of clusters of device identifiers that share a common interest;

provide at least one subset of network device identifiers corresponding to each of the plurality of clusters; and generate the device identifier similarity model based on the expanded feature data.

10. The system of claim 9, wherein the processing circuit is further operable to:

determine a first online event signal and a second online event signal based on each network device identifier's network activity; and determine a time representation of the time between the first online event signal and the second online event signal.

11. The system of claim 10, wherein the processing circuit is further operable to:

compare the time representation to a first predetermined value; and identify a long-term time representation, if the time representation is greater than the first predetermined value.

12. The system of claim 10, wherein the processing circuit is further operable to:

compare the time representation to a second predetermined value; and identify a short-term time representation, if the time representation is lesser than the second predetermined value.

13. A system for identifying similar network device identifiers comprising a processing circuit including a processor and a memory coupled thereto, the processing circuit operable to:

receive a set of network device identifiers;

identify an online event associated with network activity of each network device identifier of the first set;

identify, for each network device identifier of the first set, one or more long-term browsing history events surrounding the identified online event based on the network device identifier's network activity, the long-term browsing history events corresponding to events occurring prior to a first time from the identified online event;

identify, for each network device identifier of the first set, one or more short-term browsing history events surrounding the identified online event based on the network device identifier's network activity, the short-term browsing history events corresponding to events occurring after the first time from the identified online event;

represent each device identifier of the first set as a vector based on feature data corresponding to each network device identifier's network activity, the feature data comprising keywords corresponding to content associated with the device identifier's network activity;

apply abstractions on the feature data to form concepts, wherein each concept represents a category of interest;

derive at least one hierarchy of the feature data based on the keywords and concepts of the feature data;

expand the feature data based on the derived at least one hierarchy of the feature data;

apply a clustering algorithm on each of the vectors to identify a plurality of clusters of device identifiers that share a common interest;

provide at least one subset of network device identifiers corresponding to each of the plurality of clusters; and generate the set of similar network device identifiers based on the expanded feature data.

14. The system of claim 13, wherein the processing circuit is further operable to:

identify the one or more long-term browsing history events and the one or more the short-term browsing history events by:

identify a time representation between a first online event and a second online event; and compare the time representation with a predetermined value, wherein if the time representation is greater than the predetermined value the time representation will indicate a long-term browsing history event, and wherein if the time representation is lesser than the predetermined value the time representation will indicate a short-term browsing history event.

15. The system of claim 14, wherein the predetermined value is adjustable.

16. The system of claim 14, wherein the processing circuit is further operable to:

increment the predetermined value by a unit of measurement.

* * * * *